US012671973B2

(12) United States Patent
Hunsaker et al.

(10) Patent No.: US 12,671,973 B2
(45) Date of Patent: Jun. 30, 2026

(54) DUAL SIM DUAL STANDBY MANAGEMENT

(71) Applicant: T-Mobile Innovations LLC, Overland Park, KS (US)

(72) Inventors: Melinda Hunsaker, Kent, WA (US); Misty Dombrowski, Renton, WA (US)

(73) Assignee: T-Mobile Innovations LLC, Overland Park, KS (US)

( * ) Notice: Subject to any disclaimer, the term of this patent is extended or adjusted under 35 U.S.C. 154(b) by 294 days.

(21) Appl. No.: 18/484,791

(22) Filed: Oct. 11, 2023

(65) Prior Publication Data

US 2025/0126456 A1    Apr. 17, 2025

(51) Int. Cl.
*H04W 8/18* (2009.01)
*H04W 88/06* (2009.01)

(52) U.S. Cl.
CPC .............. *H04W 8/18* (2013.01); *H04W 88/06* (2013.01)

(58) Field of Classification Search
CPC ........ H04W 8/18; H04W 88/06; H04W 8/183
USPC ...................................................... 455/414.1
See application file for complete search history.

(56) References Cited

U.S. PATENT DOCUMENTS

| | | | |
|---|---|---|---|
| 2016/0149605 A1* | 5/2016 | Vecera ................... | H04M 15/49 455/558 |
| 2016/0262200 A1 | 9/2016 | Su | |
| 2022/0141720 A1* | 5/2022 | Jha ......................... | H04W 8/183 455/436 |
| 2022/0286839 A1 | 9/2022 | Zhao et al. | |
| 2023/0164541 A1* | 5/2023 | Ravikanti ............. | H04W 8/183 455/558 |
| 2024/0305960 A1* | 9/2024 | Tripathi ................. | H04W 4/16 |
| 2024/0396999 A1* | 11/2024 | Ngai ...................... | H04M 3/541 |

OTHER PUBLICATIONS

Vikhrova et al. (Multi-SIM support in 5G Evolution: Challenges and Opportunities; IEEE, Published 2022.) (Year: 2022).*

* cited by examiner

*Primary Examiner* — Hirdepal Singh
(74) *Attorney, Agent, or Firm* — Jones Burke, PLLC

(57) ABSTRACT

Systems and methods are provided for managing a UE in a cellular wireless network capable of dual SIM dual standby (DSDS). A first communication is received or initiated and determined to be associated with a first subscriber identity module (SIM) of the UE. In response, a set of parameters are implemented for the first communication. A second set of parameters are implemented for communications associated with a second SIM of the UE. The parameters include a time frame to receive calls at the SIM, a designated voice message box for the SIM, automated SMS messaging responses for the SIM, a designated contact group, and a designated e-mail address for the SIM.

20 Claims, 5 Drawing Sheets

300

RECEIVE THROUGH A TRANSCEIVER A
COMMUNICATION ASSOCIATED WITH A
SECOND SIM OF THE UE
410

DETERMINE THE COMMUNICATION IS
ASSOCIATED WITH A SECOND SIM
OF THE UE
420

SWITCH FROM A FIRST SET OF
PARAMETERS FOR A FIRST SIM TO A
SECOND SET OF PARAMETERS IN
RESPONSE TO DETERMINING THE
COMMUNICATION IS ASSOCIATED WITH
THE SECOND SIM
430

400

INITIATING COMMUNICATION TO BE
COMMUNICATED THROUGH A
TRANSCEIVER
510

500

DETERMINE THE COMMUNICATION IS
ASSOCIATED WITH A FIRST SIM AND NOT
A SECOND SIM OF THE UE
520

IMPLEMENT A FIRST SET OF
PARAMETERS FOR THE FIRST SIM TO
THE COMMUNICATION IN RESPONSE TO
DETERMINING THE COMMUNICATION IS
ASSOCIATED WITH THE FIRST SIM
530

DUAL SIM DUAL STANDBY MANAGEMENT

TECHNICAL BACKGROUND

A wireless network, such as a cellular network, can include an access node (e.g., wireless access node) serving multiple wireless devices or user equipment (UE) in a geographical area covered by a radio frequency transmission provided by the access node. Access nodes may deploy different carriers within the cellular network utilizing different types of radio access technologies (RATs). RATs can include, for example, 3G RATs (e.g., GSM, CDMA etc.), 4G RATs (e.g., WiMax, LTE, etc.), and 5G RATs (new radio (NR)).

Further, different types of access nodes may be implemented for deployment for the various RATs. For example, a next generation NodeB (gNodeB or gNB) may be utilized for 5G RATs. Deployment of the evolving RATs in a network provides numerous benefits. For example, newer RATs may provide additional resources to subscribers, faster communications speeds, and other advantages. Some user equipment (UE) in these networks are capable of Dual SIM Dual Standby (DSDS).

OVERVIEW

One aspect of the present disclosure relates to a system configured for managing a UE with more than one subscriber identity module sharing a transceiver. The system may include one or more hardware processors configured by machine-readable instructions. The processor(s) may be configured to receive, through the transceiver, a voice call associated with a first SIM of the UE. The processor(s) may be configured to implement a first set of parameters for the first SIM to the voice call associated with the first SIM. The processor(s) may be configured to receive, through the transceiver, a second voice call associated with a second SIM of the UE. The processor(s) may be configured to implement a second set of parameters designated for the second SIM for the voice call associated with the second SIM.

In some implementations of the system, the UE may be a mobile phone. In some implementations of the system, the mobile phone may be configured for dual SIM dual standby. In some implementations of the system, the first SIM and second SIM may be active SIM cards that both use a single radio transceiver.

In some implementations of the system, a first network subscription may be associated with the first SIM of the UE. In some implementations of the system, a second network subscription is associated with the second SIM of the UE.

In some implementations of the system, the first set of parameters for the first SIM may be one or more of a time frame to receive calls at the first SIM, a designated voice message box for the first SIM, a designated contact group, and a designated e-mail address for the first SIM.

Another aspect of the present disclosure relates to a method for managing a UE with more than one subscriber identity module sharing a transceiver. The method may include receiving, through the transceiver, a voice call associated with a first SIM of the UE. The method may include implementing a first set of parameters for the first SIM to the voice call associated with the first SIM. The method may include receiving, through the transceiver, a second voice call associated with a second SIM of the UE. The method may include implementing a second set of parameters designated for the second SIM for the voice call associated with the second SIM.

Yet another aspect of the present disclosure relates to a non-transient computer-readable storage medium having instructions embodied thereon, the instructions being executable by one or more processors to perform a method for managing a UE with more than one subscriber identity module sharing a transceiver. The method may include receiving, through the transceiver, a voice call associated with a first SIM of the UE. The method may include implementing a first set of parameters for the first SIM to the voice call associated with the first SIM. The method may include receiving, through the transceiver, a second voice call associated with a second SIM of the UE. The method may include implementing a second set of parameters designated for the second SIM for the voice call associated with the second SIM.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

BRIEF DESCRIPTION OF THE DRAWINGS

The present disclosure can be understood from the following detailed description, either alone or together with the accompanying drawings. The drawings are included to provide a further understanding of the present disclosure and are incorporated in and constitute a part of this specification. The drawings illustrate one or more examples of the present teachings and together with the description explain certain principles and operations. In the drawings.

DETAILED DESCRIPTION

In the following description, numerous details are set forth, such as flowcharts, schematics, and system configurations. It will be readily apparent to one skilled in the art that these specific details are merely exemplary and not intended to limit the scope of this application.

In addition to the particular systems and methods described herein, the operations described herein may be implemented as computer-readable instructions or methods, and a processor on the network for executing the instructions or methods. The processor may include an electronic processor.

Dual SIM Dual Standby (DSDS) describes a mobile phone with two or more subscriber identity modules (SIM) using dual SIM operation. When a second SIM is installed on a mobile phone, the mobile phone may allow users to switch between two separate mobile network services manually, have hardware support for keeping both connections in a "standby" state for automatic switching, or have two transceivers to maintain both network connections at once.

Mobile phones using DSDS have limited customization and management functions. DSDS management engine customizes dual SIM such that different parameters may be applied to each SIM separately when using the same transceiver. The parameters may include hours available, voicemail greetings, voicemail boxes, group contacts, and call forwarding services. For example, parameters for a work profile may be applied for communications for one SIM and different parameters for a personal profile may be applied to communications for the second SIM.

Figure 1:
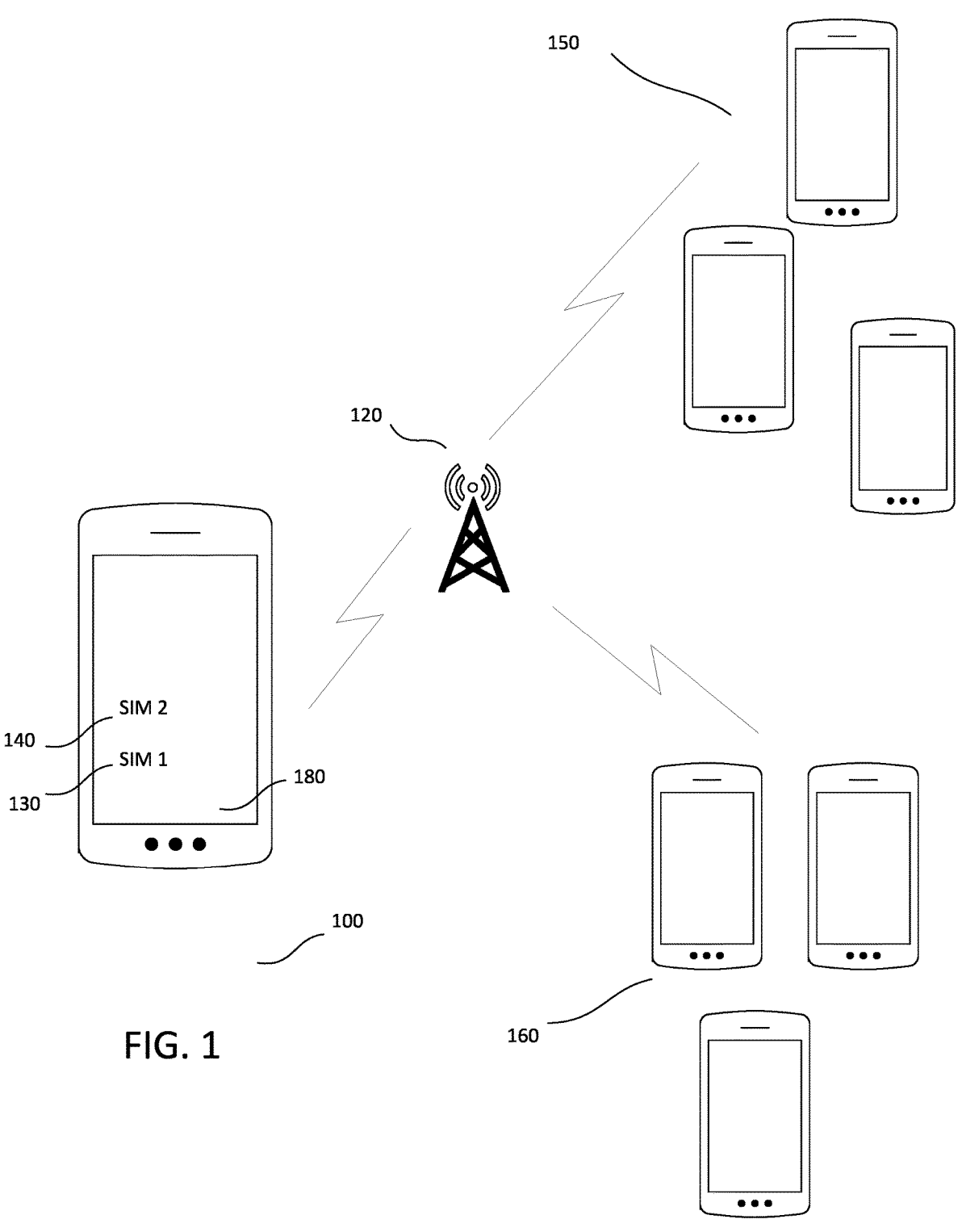
FIG. 1 depicts a wireless network that may be connected to a Dual SIM Dual Standby (DSDS) mobile device, in accordance with disclosed examples.

FIG. 1 depicts wireless environment 100 illustrating an access node 120 a UE 180 and UE groups 150 and 160. The UE 180 may be a cell phone, mobile phone, wireless phone, as well as other types of devices or systems that are capable of radio frequency communication. UE 180 is capable of attaching to access node 120. UE 180 is enabled for Dual SIM Dual Standby (DSDS). For example, UE 180 has SIM 1 (130) and SIM 2 (140). SIM 1 (130) and SIM 2 (140) are subscriber identity modules (SIM) using dual SIM operation. When a second SIM is installed on a mobile phone, the mobile phone may allow users to switch between two separate mobile network services manually, have hardware support for keeping both connections in a "standby" state for automatic switching. In an example, UE 180 has a single transceiver for use with SIM 1 (130) and SIM 2 (140).

DSDS capable UEs may have more than one Subscriber Identity Module (SIM) that provides users with access to a mobile network for each SIM card. A DSDS capable UE is one which holds multiple SIM cards, which means the device can handle two or more different wireless network subscriptions. For example, SIM 130 has a first wireless network subscription and SIM 140 has a different second wireless subscription.

When using DSDS, one of the two subscriptions may be transmitting or receiving radio frequency (RF) signals at a time. In an example, a communication for first subscription for SIM 130 is actively transmitting while a communication for the second subscription for SIM 140 is put on standby.

Access node 120 may be operated by a Mobile Network Operator (MNO). While the wireless environment is depicted with a single UE 180, single access node 120, it may comprise multiple UEs 180, access nodes 120 and multiple UE contacts 150 and 160.

Access node 120 may be for a wireless network, such as a cellular network, and can include a core network and a radio access network (RAN) serving multiple UEs 180 in a geographical area covered by a radio frequency transmission provided by the access network. As technology has evolved, different carriers (MNOs) within the cellular network may utilize different types of radio access technologies (RATs). RATs can include fifth generation (5G) RATs (new radio (NR)) and 6G. Further, different types of access nodes may be implemented within the access network for deployment for the various RATs. A next generation NodeB (gNB) may be utilized for 5G RATs. Deployment of the evolving RATs in a network provides numerous benefits. For example, newer RATs, such as 5G RATs, may provide additional resources to subscribers, faster communications speeds, and other advantages. However, increased connection optimization may be created with radar altimeters due to higher power of the next generation NodeB (gNodeB or gNB).

UE 180 communicate with other UEs. For example, UE 180 may communicate with UEs that are stored as contacts in memory of the UE 180. In example, the DSDS management engine customizes dual SIM such that different parameters for group contacts are applied to communications using SIM 1 and SIM 2. For example, using DSDS management engine, the UE may be customized to have different groups of contacts for each SIM. For example, SIM 1 may have a group of contacts 150 stored in the UE memory while SIM 2 may have a different group of contacts 160 stored in the UE memory. For example, the group of contacts 150 may be personal contacts and the group of contacts 160 may be work contacts.

Figure 2:
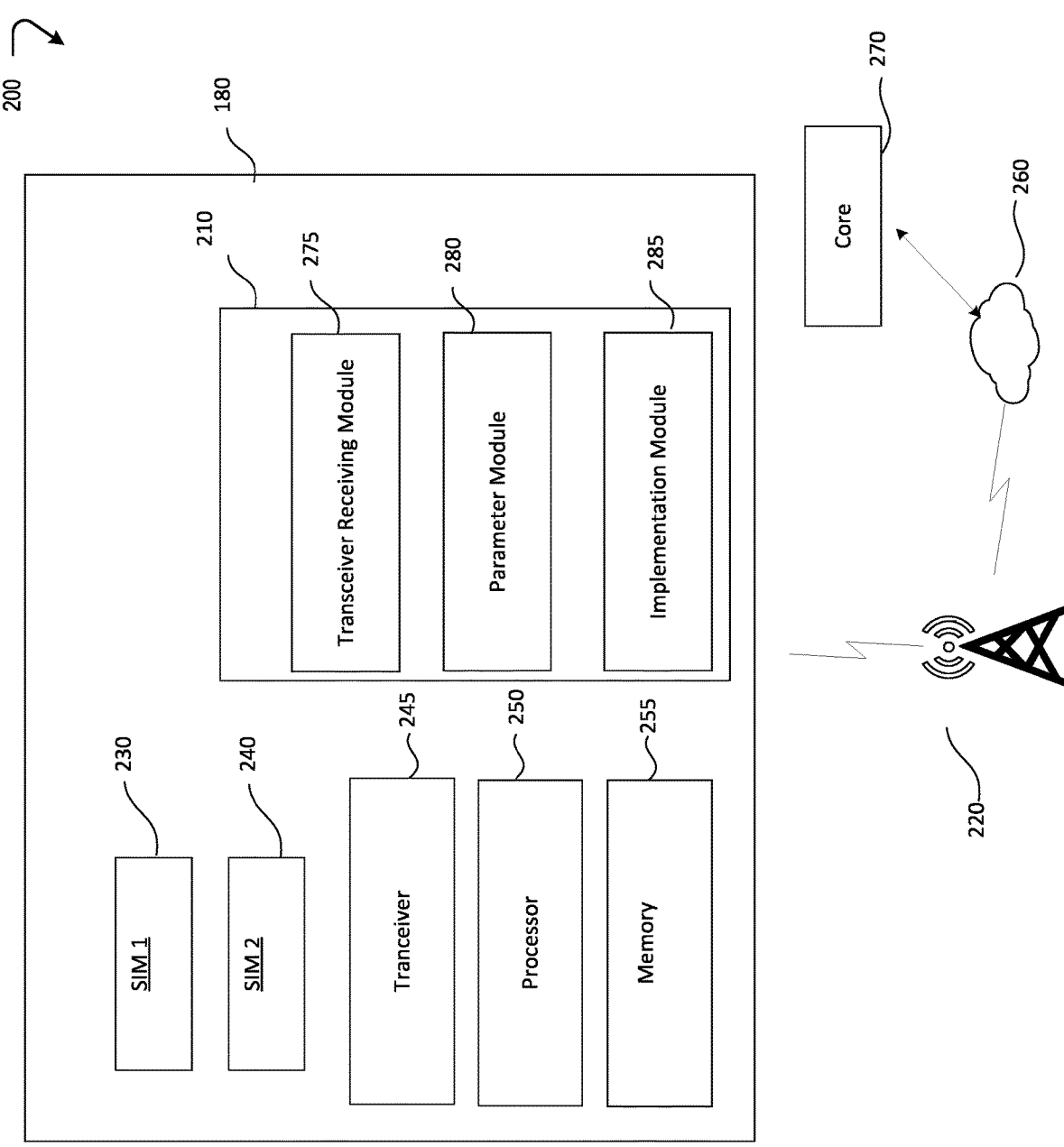
FIG. 2 illustrates a system and a DSDS Management Engine, in accordance with the disclosed examples.

FIG. 2 illustrates a system 200 configured for managing a UE with more than one subscriber identity module sharing a transceiver, in accordance with one or more implementations.

As illustrated, system 200 comprises DSDS management engine 210, an access node 220, a network 260, and a wireless network core 270. For purposes of illustration and ease of explanation, only one access node 220 are shown in the system 200; however, as noted above with regard to FIG. 1, additional access nodes and/or additional UEs may be present in the system 200.

UE 180 may be a wireless communication device having a multiple SIM 1 (230) and SIM 2 (240), transceiver 245, processor 250 and memory 255.

The UE 180 may include one or more processors 250 and memory 255 coupled to the one or more processors 250. In some examples, the one or more processors 250 may be a central processing unit (CPU), a graphics processing unit (GPU), or both CPU and GPU, or other processing unit or component known in the art. Memory 335 may include volatile memory (such as random-access memory (RAM)) and/or non-volatile memory (such as read-only memory (ROM), flash memory, etc.).

UE 180 may include transceiver 245. Transceiver 245 may connect to a radio frequency (RF) antenna, coupled to processor 250. Transceiver 245 is capable of transmitting and receiving RF signals.

SIM 230 and 240 may be a SIM cards or modules. SIM 230 and 240 are integrated circuits (IC) intended to securely store the international mobile subscriber identity (IMSI) number and its related key and is used to identify and authenticate subscribers on UE 180. SIM 230 may be associated with a first wireless subscription and SIM 240 may be associated with a second wireless subscription.

SIMs 230 and 240 comprise wireless communication service provider data and wireless communication service subscriber data for each SIM. Exemplary SIM may comprise a universal integrated circuit card (UICC) or an embedded universal integrated circuit card (eUICC). A SIM may comprise any of a phone number, (IMSI), a network identity (e.g., a public land mobile network (PLMN) identity), FPLMN, a country code, one or more network access keys, and one or more network access credentials.

The core 270 includes core network functions and elements. The core 270 may have an evolved packet core (EPC) or may be structured using a service-based architecture (SBA). The network functions and elements may be separated into user plane functions and control plane functions.

In an SBA architecture, service-based interfaces may be utilized between control-plane functions, while user-plane functions connect over point-to-point link. The user plane function (UPF) accesses a data network, such as network 260, and performs operations such as packet routing and forwarding, packet inspection, policy enforcement for the user plane, quality of service (QoS) handling, etc. The control plane functions may include, for example, a network slice selection function (NSSF), a network exposure function (NEF), a network repository function (NRF), a policy control function (PCF), a unified data management (UDM) function, an application function (AF), an access and mobility function (AMF), an authentication server function (AUSF), and a session management function (SMF). Additional or fewer control plane functions may also be included. The AMF receives connection and session related information from the wireless devices 110 and is responsible for handling connection and mobility management tasks. The SMF is primarily responsible for creating, updating, and removing sessions and managing session context. The UDM function provides services to other core functions, such as the AMF, SMF, and NEF. The UDM may function as a stateful message store, holding information in local memory. The NSSF can be used by the AMF to assist with the selection of network slice instances that will serve a particular device. Further, the NEF provides a mechanism for securely exposing services and features of the core network. The core 270 may further include one or more databases.

Access node 220 is connected to the network 260 via an NR path (including the 5G core 270); however, in practical implementations the access node 220 may be connected to network 260 via multiple paths (e.g., using multiple RATs). The access node 220 may communicate with the core 270 via one or more communication links, each of which may be a direct link. However, it will be appreciated that network 260 may be any type of network facilitating communication among DSDS Management engine 210, access node 220, and core 270.

The access node 220 may be any network node configured to provide communications between the connected wireless devices. As examples of a standard access node, the access node 220 may be a gNodeB in 5G networks, an eNodeB in 4G/LTE networks, or the like, including combinations thereof. Access node 220 and core 270 may also provide data to DSDS Management engine 210.

A DSDS Management engine 210 is in communication with the access node 220 and/or the core 270. DSDS Management engine 210 may be configured to manage a UE with more than one subscriber identity module sharing a transceiver.

The DSDS Management engine 210 can comprise one or more electronic processors and associated circuitry to execute or direct the execution of computer-readable instructions such as those described herein. In so doing, the management engine 210 can retrieve and execute software from storage, which can include a disk drive, a flash drive, memory circuitry, or some other memory device, and which may be local or remotely accessible. The software may comprise computer programs, firmware, or some other form of machine-readable instructions, and may include an operating system, utilities, drivers, network interfaces, applications, or some other type of software, including combinations thereof. Moreover, the DSDS Management engine 210 can receive instructions and other input at a user interface.

As illustrated the DSDS Management engine 210 utilizes a modular controller, a memory, wireless communication circuitry, and a bus through which the various elements of the DSDS Management engine 210 may communicate with access node 220 and core 270. The modular controller is one example of an electronic processor, and may include sub-modules or units, each of which may be implemented via dedicated hardware (e.g., circuitry), software modules which are loaded from the memory and processed by the controller, firmware, and the like, or combinations thereof.

The instruction modules may include one or more of transceiver receiving module 275, parameter module 280, implementation module 285 and/or other instruction modules. Some or all of the sub-modules or units may physically reside within the controller or may instead reside within the memory and/or may be provided as separate units, in any combination. The various sub-modules or units may include or implement logic circuits, thereby performing operations such as setting parameters, monitoring parameters, comparing parameters, and generating instructions.

While FIG. 2 illustrates transceiver receiving module 275, parameter module 280, and implementation module 285 as being separate modules, in practical implementations some of the modules may be combined with one another and/or may share components. The transceiver receiving module 275, parameter module 280, and implementation module 285, may be configured to perform various operations to implement methods in accordance with the present disclosure. While one example of operations performed by the modules is described here, in practical implementations at least some of the operations described as being performed by one module may instead be performed by another module, including a module not explicitly named here.

Transceiver module 275 may be configured to receive and initiate, through the transceiver, a communication, such as voice call or text, associated with a first SIM of the UE. The first SIM and second SIM may be active SIM cards that both use a single radio transceiver. A first network subscription may be associated with the first SIM of the UE.

Transceiver receiving module 275 may be configured to receive and initiate, through the transceiver, a second communication, such as a voice call or text, associated with a second SIM of the UE. A second network subscription associated with the second SIM of the UE.

Parameter module 280 may be configured to maintain a first set of parameters for the first SIM to the communication associated with the first SIM. By way of non-limiting example, the first set of parameters for the first SIM may be one or more of a time frame to receive calls at the first SIM, a designated voice message box for the first SIM, a designated contact group, and a designated e-mail address for the first SIM. Parameter module 280 may be configured to herein to maintain a user designated e-mail address for the first SIM is associated with the designated contact group for the first SIM. Parameter module 280 may be configured to customize text (SMS) messaging and auto response. For example, if SIM 1 is configured for a work profile, any incoming SMS communications may be configured to receive an auto SMS response. For example, outside of the SIM 1 work profile where hours are set from 8-5 pm, any incoming SMS would receive some programmable response message such as "We are closed and will respond to your request between our normal business hours of 8-5." The first set of parameters for the first SIM may be user specified.

Parameter module 280 may be configured to maintain a second set of parameters designated for the second SIM for the voice call associated with the second SIM. By way of non-limiting example, the second set of parameters for the second SIM may be one or more of a time frame to receive calls at the second SIM, a designated voice message box for the second SIM, a designated contact group, and a designated e-mail address for the second SIM. The second set of parameters for the second SIM may be user designated. The designated e-mail address for the second SIM may be associated with the designated contact group for the second SIM. Parameter module 280 may be configured to customize text (SMS) messaging and auto response for the second SIM as described above. One or more of the first set of parameters for the first SIM may be different from one or more of the second set of parameters for the second SIM. The first and second set of parameters may be user designated and maintained in the memory 255 of UE 110.

Using DSDS management engine, customers can customize the SIM settings for the UE. Using parameter module 280, a different profiles for each SIM may be created. A profile may set times to allow communications and times when to send communications to voicemail. The hours for each profile are customizable. For example, SIM 1 (230) may be set to a work profile that only receives communications. during business hours while SIM 2 (240) may be set to a personal profile that only receives communications during non-work hours.

Parameter module 280 allows customization of to set different voicemail greetings and different voicemail boxes based on a customizable profile. For example, SIM 1 (230) may be set to use a work voicemail greeting and have a work voicemail box while SIM 2 (240) may be set to use a personal voicemail greeting and have a personal voicemail box. The hours for use of the voicemail boxes may also be customized.

Parameter module 280 allows customized call forwarding between SIMs. For example, communications from SIM 1 (230) may be forwarded to SIM 2 (240) during specified hours. For example, calls from SIM 1 (230) work profile may be forwarded to SIM 2 (240) personal profile during non-business hours. Parameter module 280 allows for customization of call forwarding based on contacts. For example, communications from a designated work contact from SIM 1, such as a supervisor, may be designated to forward to the SIM 2, such as a personal line, during non-business hours. Other communications from non-designated work contacts from SIM 1 will be sent to work voicemail instead of forwarded to a personal line.

Parameter module 280 allows customized group contacts based on SIM. For example, SIM 1 may be customized with work contacts as group contacts whereas SIM 2 may be customized with personal contacts such as family and friends. Each contact can be assigned to a preferred SIM contact group. Parameter module 280 also allows e-mail designations based on SIM. For example, a work e-mail address may be designated for SIM 1 while a personal email address may be designated for SIM 2.

Implementation module 285 may be configured to determine the parameters to be applied to an incoming communication. Based on the transceiver receiving a communication via SIM 1 (230) or SIM 2, (240), implementation module determines the parameters to be implemented for the communication. Determine the parameters to be implemented bas on the type of communication received by the transceiver. For example, when the communication is for SIM 1 (230) parameters are implemented for a work profile. When the communication is for SIM 2 (240) are implemented for a personal profile.

Processor(s) 250 may be configured to execute modules 275, 280, 285 and/or other modules by software; hardware; firmware; some combination of software, hardware, and/or firmware; and/or other mechanisms for configuring processing capabilities on processor(s) 250. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 275, 280, and/or 285 are illustrated in FIG. 2 as being implemented within a single processing unit, in implementations in which processor(s) 250 includes multiple processing units, one or more of modules 275, 280, and/or 285 may be implemented remotely from the other modules. The description of the functionality provided by the different modules 275, 280, and/or 285 below is for illustrative purposes, and is not intended to be limiting, as any of modules 275, 280, and/or 285 may provide more or less functionality than is described. For example, one or more of modules 275, 280, and/or 285 may be eliminated, and some or all of its functionality may be provided by other ones of modules 275, 280, and/or 285. As another example, processor(s) 250 may be configured to execute one or more additional modules that may perform some or all of the functionality attributed below to one of modules 275, 280, and/or 285.

Figure 3:
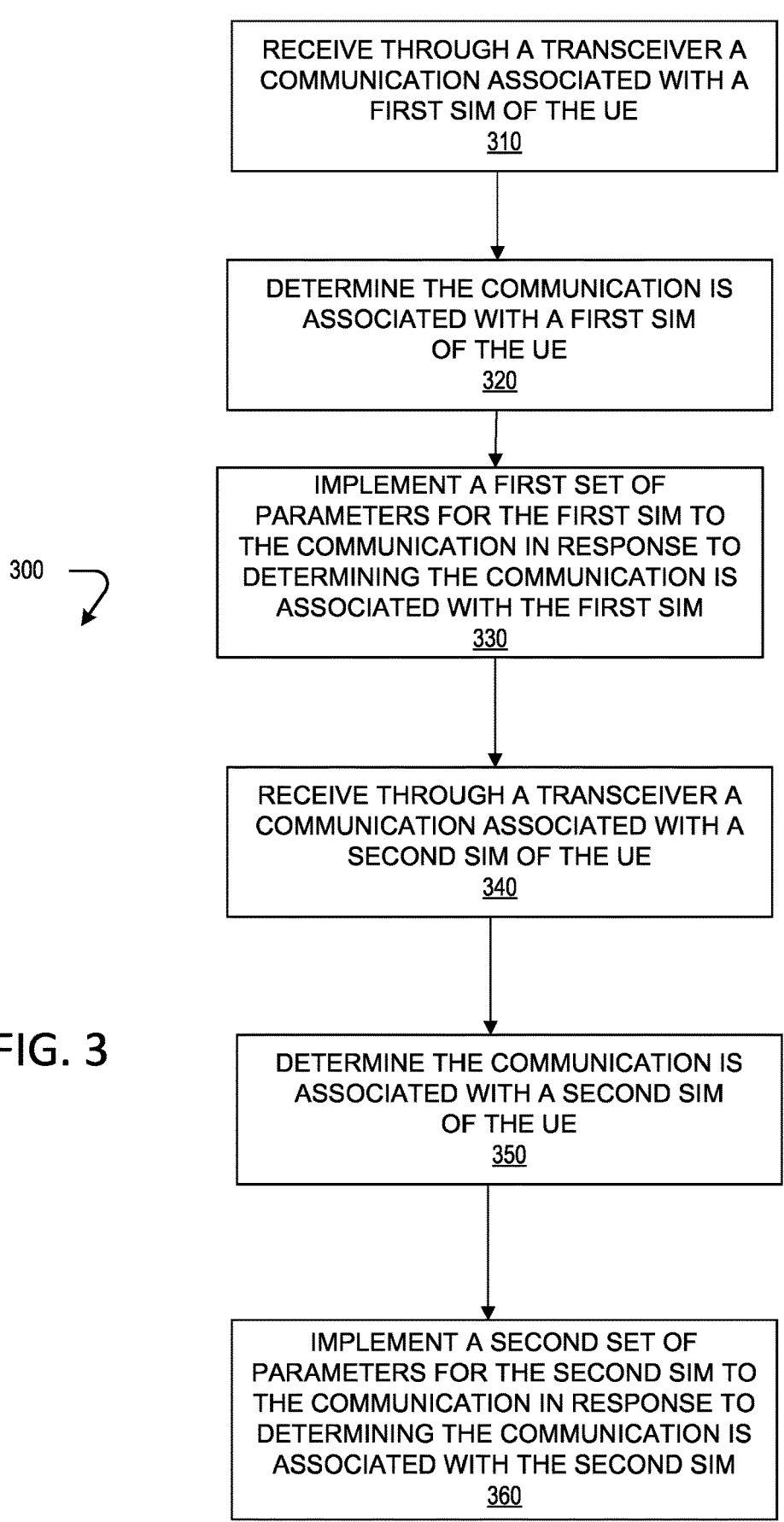
FIG. 3 illustrates a method for managing a UE with more than one subscriber identity module sharing a transceiver, in accordance with disclosed examples.

FIG. 3 illustrates an exemplary process flow for managing a UE with more than one subscriber identity module sharing a transceiver. The operations of FIG. 3 will be described as being performed by the DSDS Management engine 210 for purposes of explanation. In other implementations, the operations may be performed by or under the control of a processor of a wireless access node, 5g core or processed in a cloud environment.

FIG. 3 illustrates a method 300 for managing a UE with more than one subscriber identity module sharing a transceiver, in accordance with one or more implementations. The operations of method 300 presented below are intended to be illustrative. In some implementations, method 300 may be accomplished with one or more additional operations not described, and/or without one or more of the operations discussed. Additionally, the order in which the operations of method 300 are illustrated in FIG. 3 and described below is not intended to be limiting.

In some implementations, method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300.

The process flow begins at operation 310, when receiving, through the transceiver, a communication, such as a voice call. At operation 320 it is determined that the communication is associated with a first SIM of the UE.

At operation 330, in response to determining the communication is associated with a first SIM of the UE, a first set of parameters are implemented for the communication associated with the first SIM. The first set of parameters for the first SIM are one or more of a time frame to receive calls at the first SIM, a designated voice message box for the first SIM, a designated contact group, and a designated e-mail address for the first SIM.

At operation 340, a second communication, such as a voice call, is received through the same transceiver associated with a second SIM of the UE. At operation 350 it is determined that the second communication is associated with a second SIM of the UE. At operation 360, in response to determining the second communication is associated with a second SIM of the UE, a second set of parameters are implemented for the communication associated with the second SIM. The second set of parameters for the second SIM are one or more of a time frame to receive calls at the second SIM, a designated voice message box for the second SIM, a designated contact group, and a designated e-mail address for the first SIM. The parameters for the first SIM are different from the parameters for the second SIM.

Figure 4:
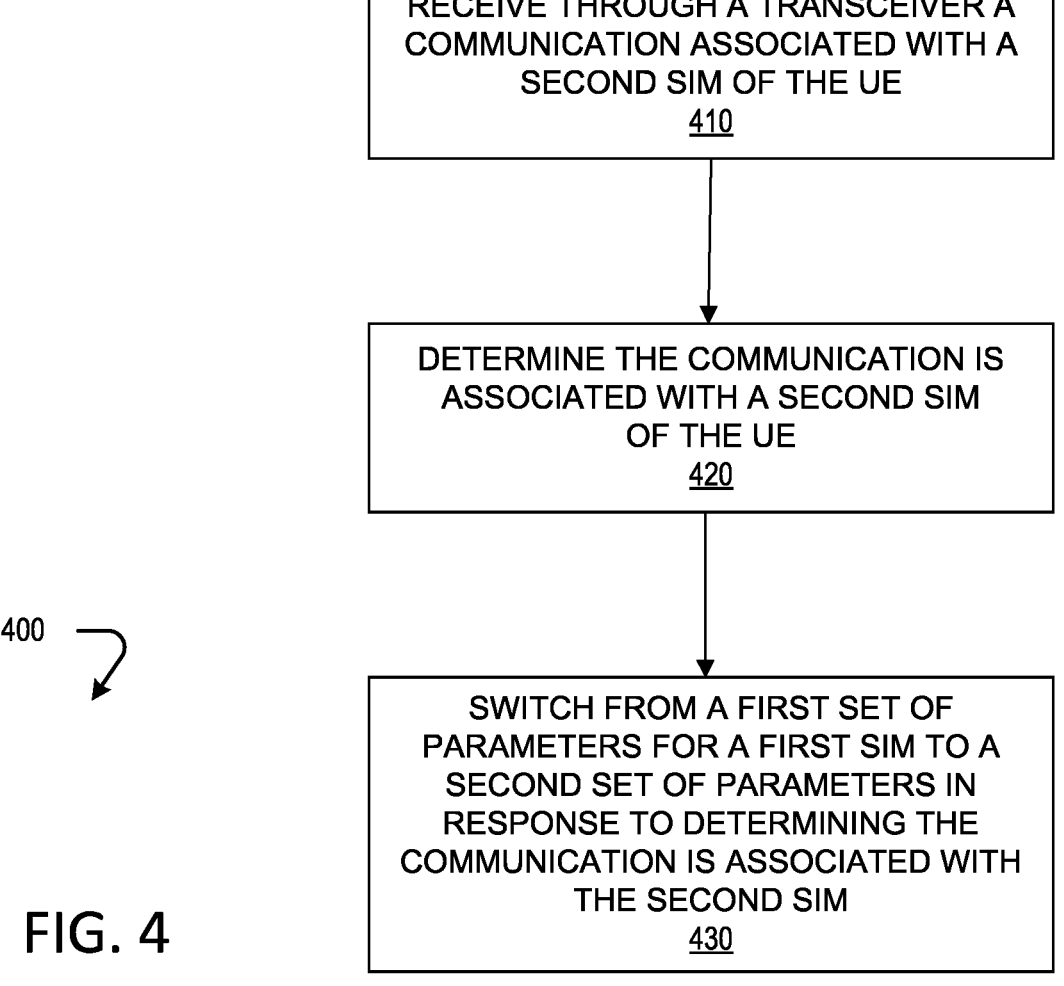
FIG. 4 illustrates a method for managing a UE with more than one subscriber identity module sharing a transceiver, in accordance with disclosed examples.

FIG. 4 illustrates an exemplary process flow for managing a UE with more than one subscriber identity module sharing a transceiver. The operations of FIG. 4 will be described as being performed by the DSDS Management engine 210 for purposes of explanation. In other implementations, the operations may be performed by or under the control of a processor of a wireless access node, 5g core or processed in a cloud environment.

FIG. 4 illustrates a method 400 for managing a UE with more than one subscriber identity module sharing a transceiver, in accordance with one or more implementations. The operations of method 400 presented below are intended to be illustrative. In some implementations, method 400 may be accomplished with one or more additional operations not described, and/or without one or more of the operations discussed. Additionally, the order in which the operations of method 400 are illustrated in FIG. 4 and described below is not intended to be limiting.

In some implementations, method 400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 400 in response to instructions stored electronically on an electronic storage medium. The one or more processing devices may include one or more devices configured through hardware, firmware, and/or software to be specifically designed for execution of one or more of the operations of method 400.

The process flow begins at operation 410, when receiving, through the transceiver, a communication, such as a voice call. At operation 420 it is determined that the communication is associated with a second SIM of the UE.

At operation 430, the UE switches from a first set of parameters for a first SIM to a second set of parameters in response to determining the communication is associated with the second SIM. The UE is capable of switching between parameters for the first SIM and the second SIM and vice versa, depending on whether the communication is associated with the first SIM or the second SIM.

Figure 5:
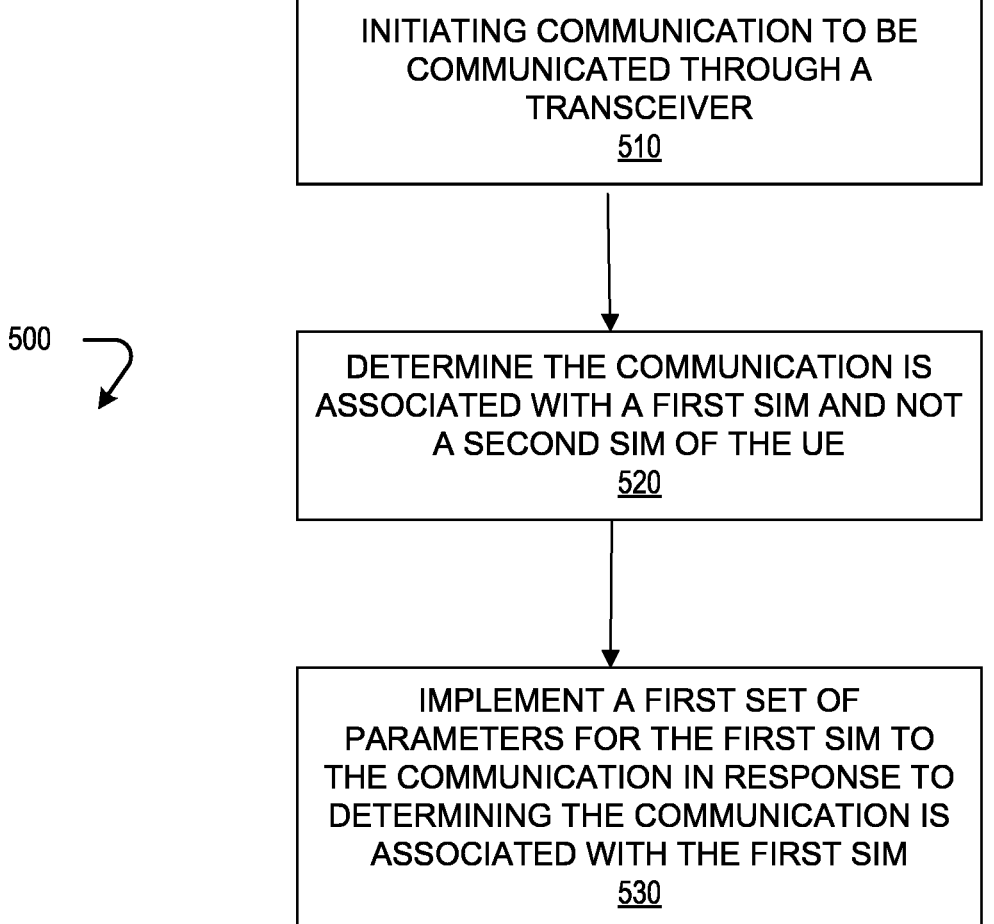
FIG. 5 illustrates a method for managing a UE with more than one subscriber identity module sharing a transceiver, in accordance with disclosed examples.

FIG. 5 illustrates an exemplary process flow for managing a UE with more than one subscriber identity module sharing a transceiver. The operations of FIG. 5 will be described as being performed by the DSDS Management engine 210 for purposes of explanation. In other implementations, the operations may be performed by or under the control of a processor of a wireless access node, 5g core or processed in a cloud environment.

FIG. 5 illustrates a method 500 for managing a UE with more than one subscriber identity module sharing a transceiver, in accordance with one or more implementations.

The operations of method 500 presented below are intended to be illustrative. In some implementations, method 500 may be accomplished with one or more additional operations not described, and/or without one or more of the operations discussed. Additionally, the order in which the operations of method 500 are illustrated in FIG. 5 and described below is not intended to be limiting.

In some implementations, method 500 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 500 in response to instructions stored electronically on an electronic storage medium. The one or more processing devices may include one or more devices configured through hardware, firmware, and/or software to be specifically designed for execution of one or more of the operations of method 500.

The process flow begins at operation 510, when a communication, such as a voice call, is initiated at the UE to be communicated by the transceiver. At operation 520 it is determined that the communication is associated with a first SIM and not the second SIM of the UE.

At operation 530, in response to determining the communication is associated with a first SIM and not the second SIM of the UE, a first set of parameters for the first SIM are implemented for the initiated communication associated with the first SIM. The first set of parameters for the first SIM are one or more of a time frame to receive calls at the first SIM, a designated voice message box for the first SIM, a designated contact group, and a designated e-mail address for the first SIM.

In an example a second communication, such as a voice call, is initiated through the same transceiver associated of the UE. IT is determined that the second communication is associated with a second SIM and not the first SIM of the UE. In response to determining the second communication is associated with a second SIM of the UE, a second set of parameters are implemented for the second SIM to the communication associated with the second SIM. The second set of parameters for the second SIM are one or more of a time frame to receive calls at the second SIM, a designated voice message box for the second SIM, a designated contact group, and a designated e-mail address for the first SIM. The parameters for the first SIM are different from the parameters for the second SIM.

The operations of 300, 400 and 500 need not necessarily be performed one after another in immediate sequence. While the above descriptions illustrate various aspects of the present disclosure, the present disclosure is not so limited. The methods and operations described above may be performed in an iterative matter. These additional iterations may also be reverted in a manner similar to that described above.

The exemplary systems and methods described herein may be performed under the control of a processing system executing computer-readable codes embodied on a computer-readable recording medium or communication signals transmitted through a transitory medium. The computer-readable recording medium may be any data storage device that can store data readable by a processing system, and may include both volatile and nonvolatile media, removable and non-removable media, and media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid-state storage devices. The computer-readable recording medium may also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention and are intended to be illustrative and not restrictive. Many examples and applications other than the examples provided would be apparent to those skilled in the art upon reading the above description. The scope should be determined, not with reference to the above description, but instead with reference to the appended claims, along with the full scope of equivalents to which such claims are entitled. It is anticipated and intended that future developments will occur in the technologies discussed herein, and that the disclosed systems and methods will be incorporated into future examples. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary is made herein. In particular, the use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A system configured for managing a UE with more than one subscriber identity modules sharing a transceiver, the system comprising:

one or more hardware processors configured by machine-readable instructions to:

receive, through the transceiver, a voice call;

determine the voice call associated with a first subscriber identity module (SIM) of the UE;

in response to determining the voice call associated with the first SIM, implement a first set of parameters for the first SIM to the voice call associated with the first SIM;

receive, through the transceiver, a second voice call;

determine the second voice call is associated with a second SIM of the UE; and

in response to determining the second voice call associated with the second SIM, implement a second set of parameters designated for the second SIM for the second voice call associated with the second SIM.

2. The system of claim 1, wherein the UE is a mobile phone.

3. The system of claim 2, wherein the mobile phone is configured for dual SIM dual standby.

4. The system of claim 3, wherein the first SIM and the second SIM are active SIM cards that both use a single radio transceiver.

5. The system of claim 1, wherein a first network subscription is associated with the first SIM of the UE.

6. The system of claim 1, wherein a second network subscription is associated with the second SIM of the UE.

7. The system of claim 1, wherein the first set of parameters for the first SIM are one or more of a time frame to receive calls at the first SIM, a designated voice message box for the first SIM, a designated contact group, automated response messages for SMS messaging for the first SIM and a designated e-mail address for the first SIM.

8. A method of managing a UE with more than one subscriber identity module sharing a transceiver, the method comprising:

receiving, through the transceiver, a voice call;

determining the voice call is associated with a first SIM of the UE;

in response to determining the voice call associated with the first SIM, implementing a first set of parameters for the first SIM to the voice call associated with the first SIM;

receiving, through the transceiver, a second voice call;

determining the second voice call is associated with a second SIM of the UE; and in response to determining the second voice call associated with the second SIM, implementing a second set of parameters designated for the second SIM for the second voice call associated with the second SIM.

9. The method of claim 8, wherein the UE is a mobile phone.

10. The method of claim 9, wherein the mobile phone is configured for dual SIM dual standby.

11. The method of claim 10, wherein the first SIM and second SIM are active SIM cards that both use a single radio transceiver.

12. The method of claim 8, wherein a first network subscription is associated with the first SIM of the UE.

13. The method of claim 8, wherein a second network subscription is associated with the second SIM of the UE.

14. The method of claim 8, wherein the first set of parameters for the first SIM are one or more of a time frame to receive calls at the first SIM, a designated voice message box for the first SIM, a designated contact group, and a designated e-mail address for the first SIM.

15. A non-transitory computer-readable storage medium having instructions embodied thereon, the instructions being executable by one or more processors to perform a method for managing a UE with more than one subscriber identity module sharing a transceiver, the method comprising:

receiving a voice call through the transceiver;

determining the voice call is associated with a first SIM and not a second SIM of the UE; and implementing a first set of parameters for the first SIM for the voice call associated with the first SIM in response to determining the voice call is associated with the first SIM and not the second SIM of the UE, wherein the first SIM and the second SIM are configured to receive voice calls.

16. The non-transitory computer-readable storage medium of claim 15, wherein the UE is a mobile phone.

17. The non-transitory computer-readable storage medium of claim 16, wherein the mobile phone is configured for dual SIM dual standby.

18. The non-transitory computer-readable storage medium of claim 17, wherein the first SIM and second SIM are active SIM cards that both use a single radio transceiver.

19. The non-transitory computer-readable storage medium of claim 15, wherein a first network subscription is associated with the first SIM of the UE and a second network subscription is associated with the second SIM of the UE.

20. The non-transitory computer-readable storage medium of claim 15, wherein the first set of parameters for the first SIM are one or more of a time frame to receive calls at the first SIM, a designated voice message box for the first SIM, a designated contact group, and a designated e-mail address for the first SIM.

\* \* \* \* \*